(12) United States Patent
Husmann, Jr.

(10) Patent No.: US 7,699,078 B1
(45) Date of Patent: Apr. 20, 2010

(54) THERMALLY INSULATED DUCTWORK AND METHOD OF MANUFACTURE

(76) Inventor: Jackie Husmann, Jr., 4209 N. Hwy. 77 Frontage Rd., Ponca City, OK (US) 74601

( * ) Notice: Subject to any disclaimer, the term of this patent is extended or adjusted under 35 U.S.C. 154(b) by 0 days.

(21) Appl. No.: 11/707,368

(22) Filed: Feb. 16, 2007

Related U.S. Application Data

(60) Provisional application No. 60/774,691, filed on Feb. 16, 2006.

(51) Int. Cl.
*F16L 11/00* (2006.01)

(52) U.S. Cl. .................. 138/114; 138/148; 138/177; 138/DIG. 9; 138/149

(58) Field of Classification Search .................. 138/114, 138/149, 148, 177, DIG. 9
See application file for complete search history.

(56) References Cited

U.S. PATENT DOCUMENTS

| | | | | |
|---|---|---|---|---|
| 3,693,665 | A * | 9/1972 | Veerling et al. | 138/149 |
| 3,731,710 | A * | 5/1973 | Bauer et al. | 138/143 |
| 3,992,237 | A * | 11/1976 | Gerholt et al. | 156/86 |
| 4,162,093 | A * | 7/1979 | Sigmund | 285/47 |
| 4,219,225 | A * | 8/1980 | Sigmund | 285/47 |
| 4,567,708 | A * | 2/1986 | Haekkinen | 52/742.13 |
| 4,590,971 | A * | 5/1986 | Webster et al. | 138/149 |
| 4,615,359 | A | 10/1986 | Affa et al. | 138/104 |
| 4,691,741 | A | 9/1987 | Affa et al. | 138/113 |
| 5,732,742 | A * | 3/1998 | Mentzer et al. | 138/97 |
| 5,996,643 | A * | 12/1999 | Stonitsch | 138/143 |
| 6,026,861 | A * | 2/2000 | Mentzer et al. | 138/97 |
| 6,231,704 | B1 | 5/2001 | Carpinetti | 156/71 |
| 6,234,163 | B1 | 5/2001 | Garrod | 126/80 |
| 6,273,144 | B1 * | 8/2001 | Bohon et al. | 138/149 |
| 6,360,783 | B2 | 3/2002 | Faverio, IV et al. | 138/149 |
| 6,527,013 | B2 | 3/2003 | Sommerville et al. | 138/148 |
| 6,848,720 | B2 * | 2/2005 | Carns et al. | 285/123.15 |
| 7,036,531 | B2 | 5/2006 | Manini et al. | 138/149 |

* cited by examiner

*Primary Examiner*—Patrick F Brinson
(74) *Attorney, Agent, or Firm*—Crowe & Dunlevy

(57) ABSTRACT

A method for manufacturing an insulated duct segment includes the step of forming an inner duct that has an inner duct cross-sectional area and an inner duct length. An outer duct with an outer duct cross-sectional area and an outer duct length is also formed. The method further includes the step of placing the inner duct inside the outer duct such that an annular space is formed between the inner duct and the outer duct. Finally, fluidized insulating material is injected into the annular space.

4 Claims, 6 Drawing Sheets

THERMALLY INSULATED DUCTWORK AND METHOD OF MANUFACTURE

RELATED APPLICATIONS

This application claims the benefit of U.S. Provisional Patent Application Ser. No. 60/774,691, entitled Thermally Insulated Ductwork and Method of Manufacture, filed Feb. 16, 2006, the disclosure of which is hereby incorporated by reference.

FIELD OF THE INVENTION

This invention relates generally to the field of ductwork manufacture, and more particularly to thermally insulated ductwork and the associated methods of manufacture.

BACKGROUND

HVAC (heating, ventilation and air-conditioning) and climate control systems are used to control the humidity, temperature, pressure and air quality within a building. HVAC systems may include a number of components, including air filters, blowers, de-humidifiers, and heating and cooling elements. Ductwork is used to transfer air from the various components within the HVAC system. Over the years, ductwork has been constructed using a variety of methods and materials. In many cases, ductwork is fabricated from single-walled sheet metal formed into conduits having rectangular or circular cross-sections. In other applications, flexible, insulated ductwork is used to deliver air from central heating and cooling components. Insulated ductwork increases the overall efficiency of the HVAC system by limiting heat transfer between the treated air and the surrounding environment.

While generally effective, prior art ductwork suffers several deficiencies. The thermal insulation provided by the ductwork is often insufficient. Additionally, ductwork that exhibits an elevated measure of thermal resistance tends to be unwieldy, oversized, difficult to install and expensive. It is to this, and other deficiencies in the prior art, that the present invention is directed.

SUMMARY OF THE INVENTION

The present application, discloses a method for manufacturing an insulated duct segment. In preferred embodiments, the method includes the steps of forming an inner duct, forming an outer duct, placing the inner duct inside the outer duct such that an annular space is formed between the inner duct and the outer duct, and injecting fluidized insulating material into the annular space.

WRITTEN DESCRIPTION

Figure 1:
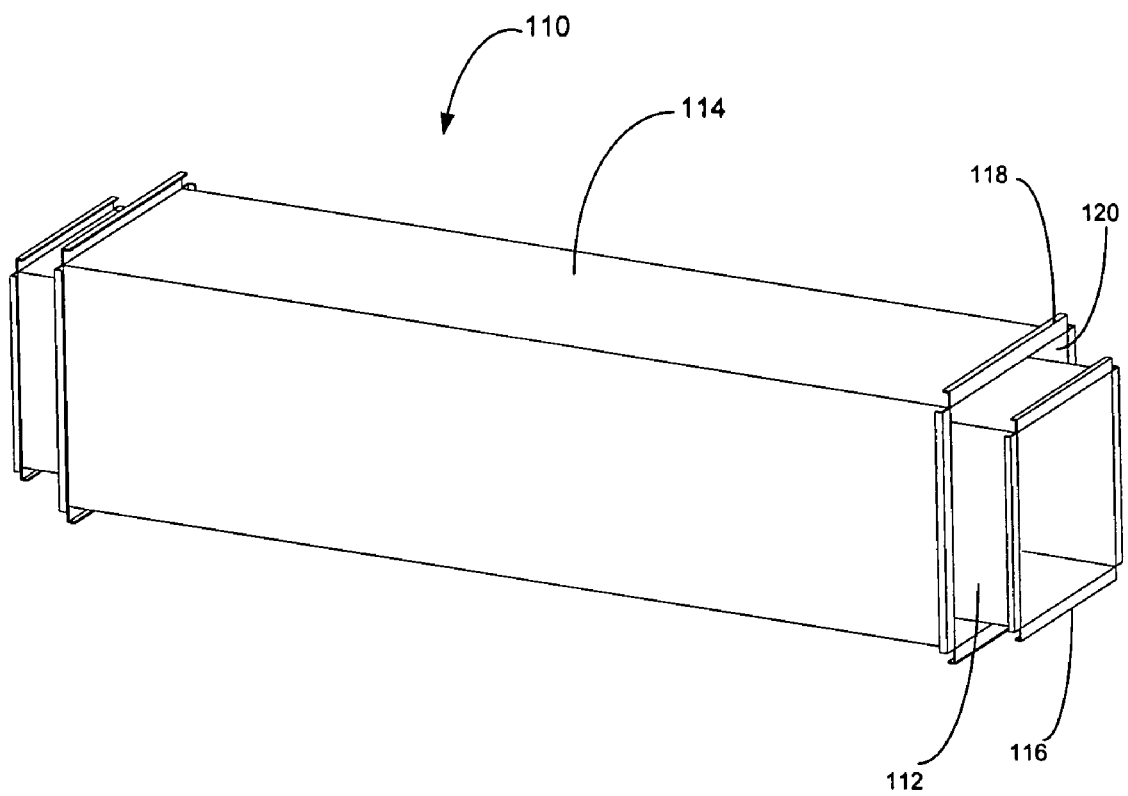
FIG. 1 is a perspective view of a thermally insulated duct segment constructed in accordance with a preferred embodiment of the present invention.

Referring to FIG. 1, shown therein is a cross-sectional view of a portion of a straight duct segment 110 constructed in accordance with a preferred embodiment. The size of the duct segment 110 is preferably determined based on the volume of air requirements, taking into consideration if the duct is for a makeup air unit or for a return makeup air unit. The duct segment 110 is preferably fabricated in lengths that facilitate shipping and installation. In a particularly preferred embodiment, each duct segment 110 is about 4.5 feet long.

The straight duct segment 110 includes an inner duct 112 and an outer duct 114. The inner duct 112 is preferably constructed by forming a male and female seam (not shown) on opposite sides of a piece of sheet metal. When the male and female seams are mated, the resulting folded or bent piece of sheet metal forms a conduit. The material of construction will depend upon a number of variables, including application-specific requirements, cost and weight. In a preferred embodiment, the sheet metal is galvanized or stainless steel.

The inner duct 112 has a length ("inner duct length") and a cross-sectional area ("inner duct cross-sectional area"). The inner duct 112 can be configured with a variety of cross-sectional shapes, including rectangular and circular designs. The ends of the inner duct 112 are constructed by flanging the metal at a right angle, creating an inner connection flange 116 that will allow the assembled duct segment 110 to be connected to an adjacent duct segment.

The outer duct 114 is also constructed by forming a male and female seam on opposite sides of a piece of sheet metal that, when engaged, form a longitudinal seam and an open-ended conduit. The outer duct 114 has a length ("outer duct length") and a cross-sectional area ("outer duct cross-sectional area"). In a preferred embodiment, the cross-sectional shape of the outer duct 114 is substantially the same as the corresponding inner duct 112. The outer duct cross-sectional area is larger than the inner duct cross-sectional area. The difference between the outer duct cross-sectional area and the inner duct cross-sectional area can be adjusted to increase or decrease the insulating properties provided by the duct segment 110. The ends of the outer duct 114 are constructed by flanging the metal out at a right angle, creating an outer connection flange 118.

The length of the outer duct 114 is shorter than the length of the inner duct 112. In a particularly preferred embodiment, the inner duct 112 extends three inches (3") on both sides of the outer duct 114. During manufacture, the inner duct 112 is substantially centered within the outer duct 114 such that an annular space 120 is formed between the inner duct 112 and outer duct 114. Once centered, fluidized insulation 122 (shown in FIG. 2) is injected into the annular space 120. In a particularly preferred embodiment, the fluidized insulation is closed-cell polyurethane foam. The foam will be filled to approximately the edges of the outer duct 114. Thus, a portion of the inner duct 112 will extend beyond the insulation and outer duct 114 on each end of the duct segment 110.

Figure 2:
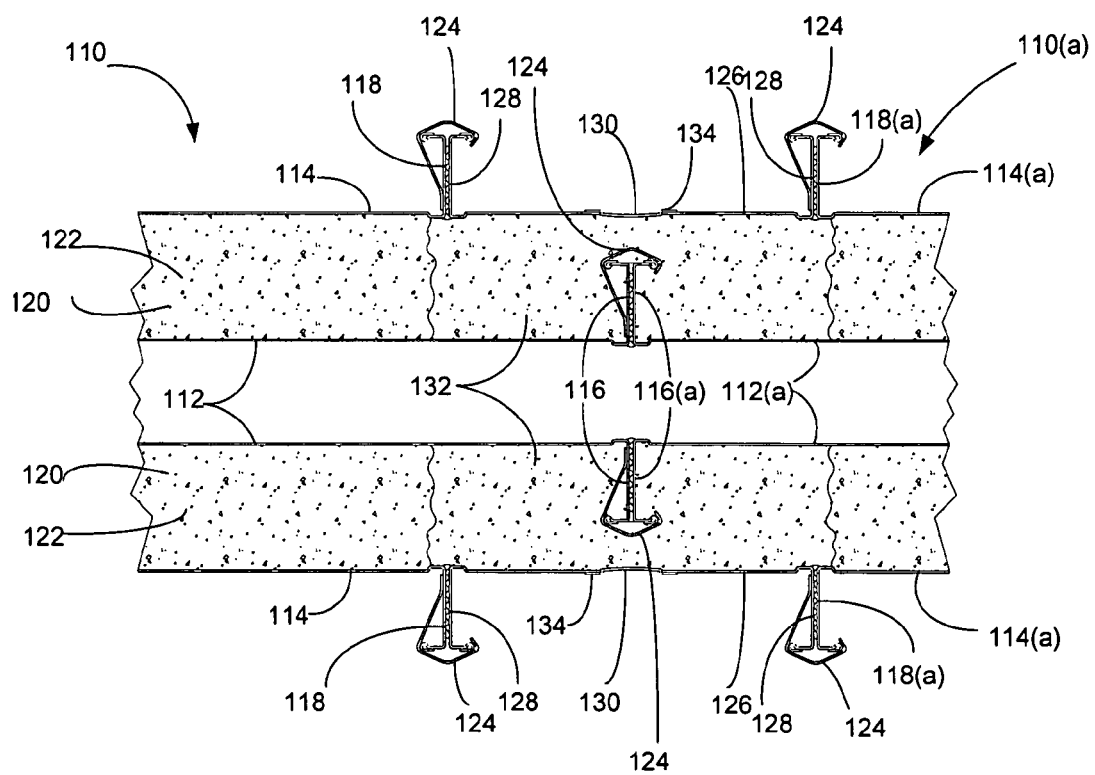
FIG. 2 is a side cross-sectional view of a thermally insulated duct constructed in accordance with a preferred embodiment of the present invention.

Turning to FIG. 2, once the fluidized insulation 122 has expanded within the annular space 120 and hardened, an inner duct 112(a) of the adjacent duct segment 110(a) can be attached to the inner duct 112 of the first duct segment 110 via flanges 116, 116(a). Because the outer duct 114 is shorter than the inner duct 112, there is a space between the outer duct 114 and an outer duct 114(a) of the adjacent duct segment 110(a). This space allows the installation of fastener corners and cleats to join the inner duct 112 to the adjacent inner duct 112(a). When assembling, adjacent inner connection flanges 116 and 116(a) are preferably coated with a sealant before being fastened/clamped together. In the presently preferred embodiment, adjacent inner connection flanges 116 and 116(a) are clipped or otherwise joined together. In a particularly preferred embodiment, the clips 124 are TDC clips.

After the inner ducts 112, 112(a) have been connected, a fill joint 126 is installed between the outer ducts 114, 114(a) of the first duct segment 110 and the adjacent duct segment 110(a). The fill joint 126 is preferably a flat piece of sheet metal that is flanged to form a segment to span the space between the adjacent outer ducts 114, 114(a). The fill joint 126 preferably includes right angle flanges 128 on each edge that will fit between the outer connection flanges 118, 118(a), thus covering the exposed joint of the inner duct. The fill joint 126 is preferably secured to the outer connection flanges 118, 118(a) by the same clips 124 used to connect adjacent inner connection flanges 116, 116(a). An annular space 132 is created between the fill joint 126 and the exposed portion of inner ducts 112, 112(a).

The fill joint 126 has one or more injections holes 130 to permit the injection of fluidized insulation 122 into the annular space 132. Once the fill joint 126 is fastened to the other outer ducts 114, 114(a), the fluidized insulation 122, preferably closed-cell polyurethane foam, is injected. The foam expands as it cures and bonds to the existing foam in the annular space 120 to form an air-tight seal. Once the injection process is complete, plastic plugs 134 are inserted to seal the injection holes 130. The plastic plugs 134 are then preferably sealed on the fill joint 126 with a sealant. When completed, this process forms a weatherproof duct that is air tight, well insulated and strong.

Depending on the length of the linear run and the accessible of the installation site, several segments and/or transitions and elbows may be connected and continually foamed before leaving exposed inner duct ends.

In order to change the dimensions and/or the flow of the air from one size and direction to another, a duct transition, offset or tee is constructed using the same manufacturing procedures used to prepare the straight duct segment 110. In some cases the transition, offset or tee will stand alone. When possible, these units may be directly joined to one or more lengths of straight duct and continually foamed. In all cases the inner duct will extend beyond the outer duct on both ends of the component.

Figure 3:
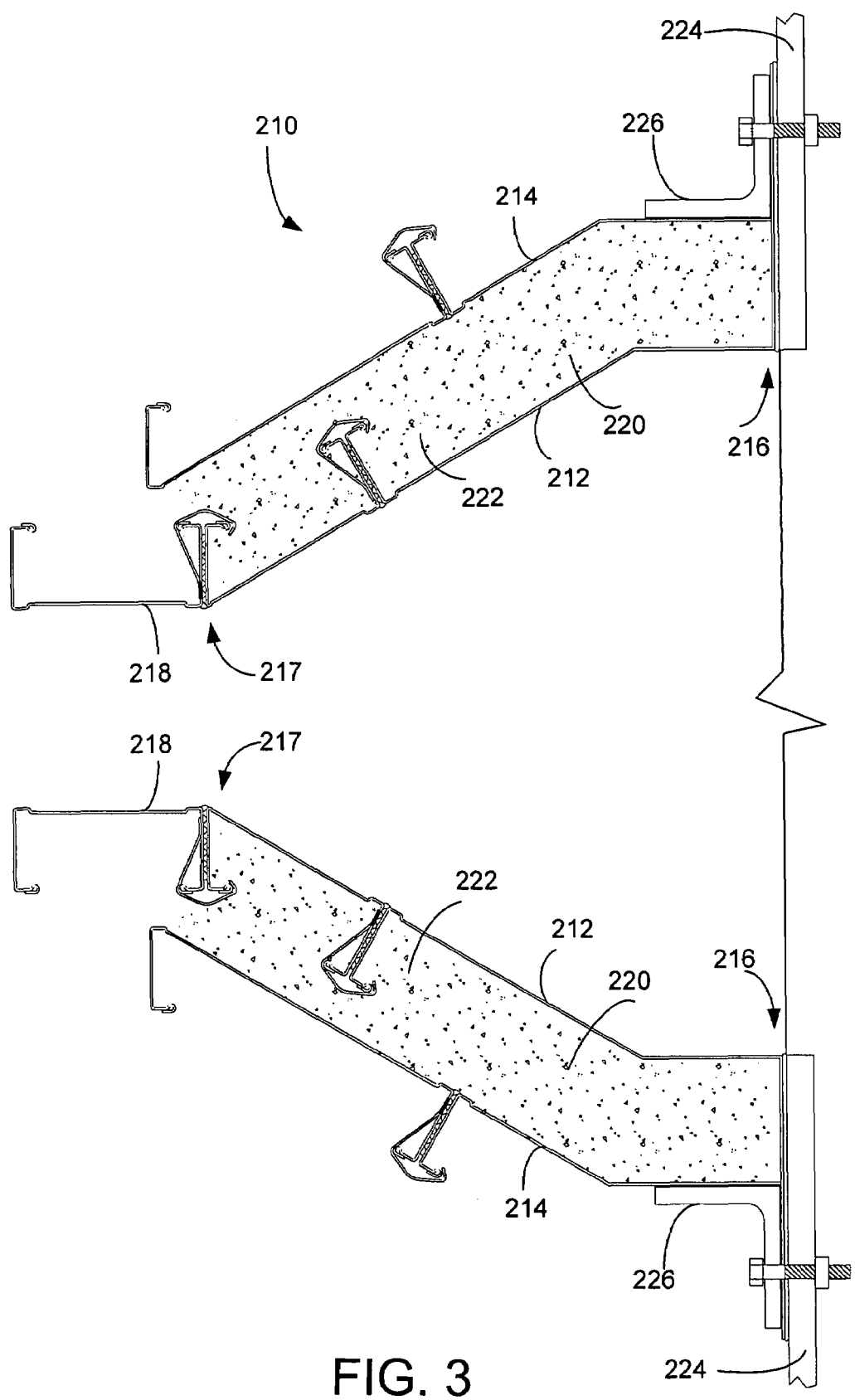
FIG. 3 is a side cross-sectional view of a transition duct constructed in accordance with a preferred embodiment.

As shown in FIG. 3, a transition duct 210 can be constructed that will connect an air delivery unit 224 to straight duct segment 110 (not shown in FIG. 3) based on the dimensions of the air delivery unit 224. The transition duct 210 comprises a first end 216 that attaches to the air delivery unit 224, a second end 217, an inner duct 212, an outer duct 214, a short extension 218, and an annular space 220 filled with fluidized insulation 222. The process of constructing transition duct 210 employs substantially the same construction procedures used for the straight duct segment 110. However, on the first end 216 of the transition 210, the inner duct 212 does not extend beyond the outer duct 214.

To form a connection to air delivery unit 224, the outer duct 214 at first end 216 flanges outward, and an angle iron reinforcement frame 226 is welded to the outer duct 214. This frame 226 stiffens the connection and aids in the secure attachment to the unit 224. The annular space 220 is filled with fluidized insulation 222, which is preferably closed-cell polyurethane foam, and the end 216 is sealed with a sealant and then bolted or screwed to the air unit 224. In a preferred embodiment, a short extension 218 is included on the inner duct 212 at first end 217 so that the inner duct 212 protrudes beyond the outer duct 214, preferably by at least 3". Construction of the duct may then continue in the manner described in relation to straight duct segment 110. A fill joint (not shown in FIG. 3) may be attached to the outer duct 214, and then a straight duct segment may be attached to the transition duct 210.

Figure 4:
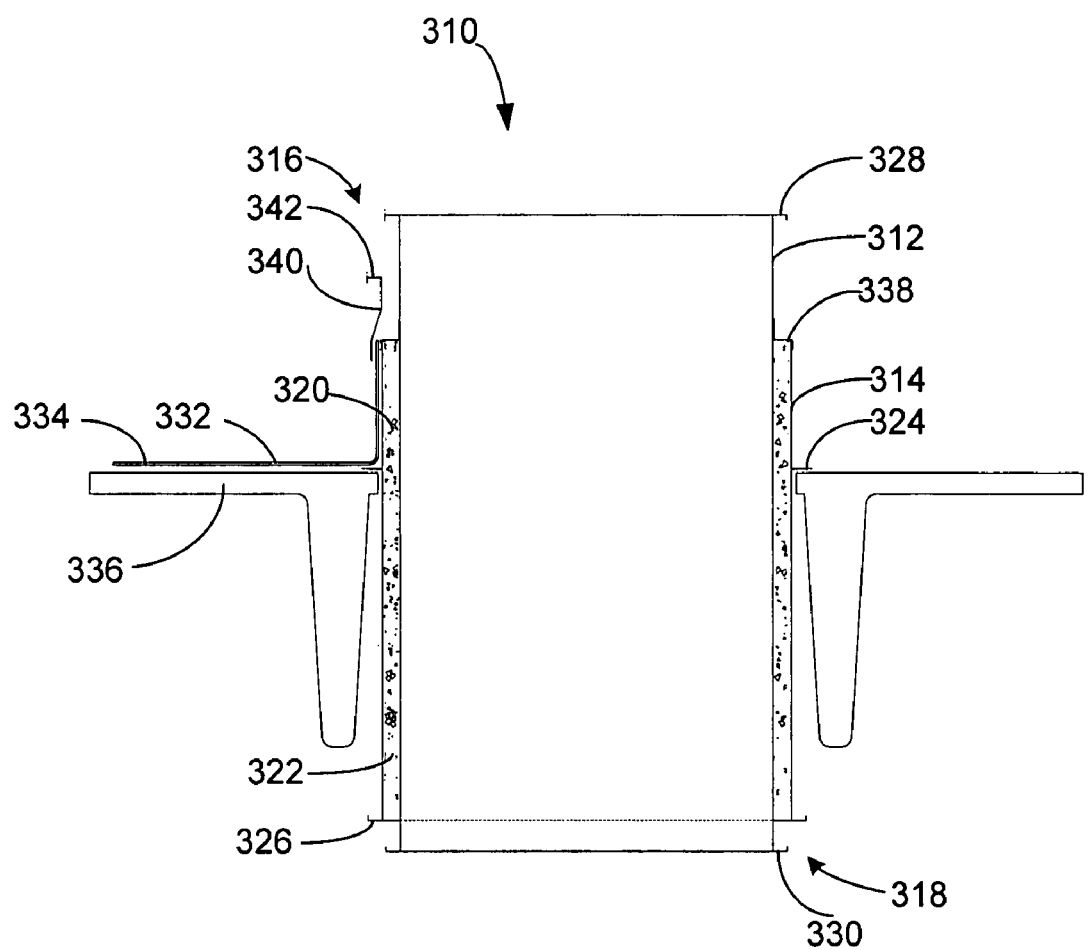
FIG. 4 is a side cross-sectional view of a curb/duct combination module constructed in accordance with a preferred embodiment.

As shown in FIG. 4, the same underlying procedure used to manufacture the straight duct segment 110 can be used to fabricate a curb/duct combination module 310. Roof curbs may be constructed in a variety of ways, depending on the needs of the building site. Some roofs are nearly flat and some have a heavy pitch. In all cases, the curb is constructed to match the roof pitch and still leave the top surface of the curb level. In a preferred embodiment, the height of the curb is a minimum of 12", but can be as high as 18". The height is determined by the weather and water shield requirements of the climate.

The curb/duct module 310 includes an inner duct 312 and an outer curb surface 314, an upper end 316 and a lower end 318, and an annular space 320 filled with fluidized insulation 322. The outer curb surface 314 includes a flange 324 at the roofline 332 and a flange 326 and at the lower end 318. The inner duct 312 includes a flange 328 at the upper end 316 and a flange 330 and the lower end 318. When the curb/duct module 310 is in place, the inner duct 312 extends through the outer curb surface 314. Therefore, outer curb surface 314 is made larger than the inner duct 312 to allow the inner duct 312 to be slid through the inside of outer curb surface 314. Flanges 324 at the roofline 332 are wide enough to completely cover the hole that is cut in the roof. In FIG. 4, roofing 334 at roofline 332 sets upon roof tee 336.

In a preferred embodiment, inner duct 312 extends above the outside surface 314 of the curb/duct module 310 to make a better water-tight connection. Four heavy angles of metal 338 are screwed to the inner duct 312 and to the outer curb surface 314 to transfer the duct weight to the outer curb surface 314. Thus, the outer curb surface 314 of curb/duct combination 310 is made of heavier metal to make it strong enough to bear the weight of the inner duct 312.

To make the connection between the roof and the curb/duct module 310 watertight, roofing 334 is sealed to the outer curb surface 314. Flashing 340 is then added over roofing 334 and attached to outer curb surface 314. Flashing 340 includes a flange 342. If the duct is to be extended above the curb/duct module 310, the inner duct of a straight duct segment 110 (not shown) can be attached to flange 328. A fill joint 126 (not shown) can then be attached to flange 342 of the flashing 340, and the duct can be continued in the manner described above in relation to FIGS. 1 and 2.

If a duct segment 110 is to continue below the curb/duct module 310, the lower end 318 of outer curb surface 314 includes a flange 326 that extends outward, as shown in FIG. 4. An adjacent inner duct (not shown) may be attached to flange 330 of the inner duct 312 of curb/duct module 310. A fill joint 126 (not shown) may then be attached to flange 326 to continue the outer wall.

Figure 5:
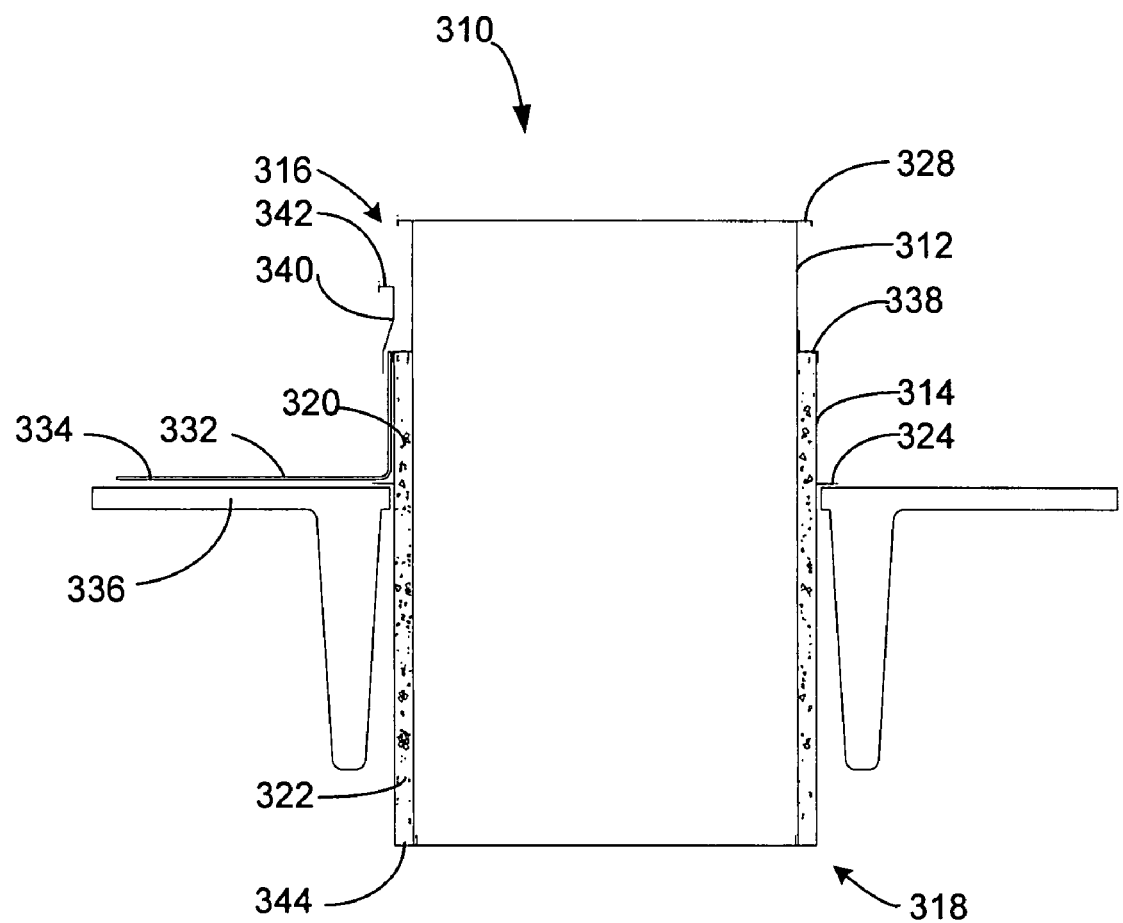
FIG. 5 is a side cross-sectional view of a curb/duct combination module constructed in accordance with a preferred embodiment.

Alternatively, as shown in FIG. 5, if the duct terminates near or at lower end 318 of curb/duct module 310, the outer curb surface 314 may include a flange 344 that extends inward and upward. The flange 344 creates a metal encasement so that fluidized foam 322 may be injected in to annular space 320.

Figure 6:
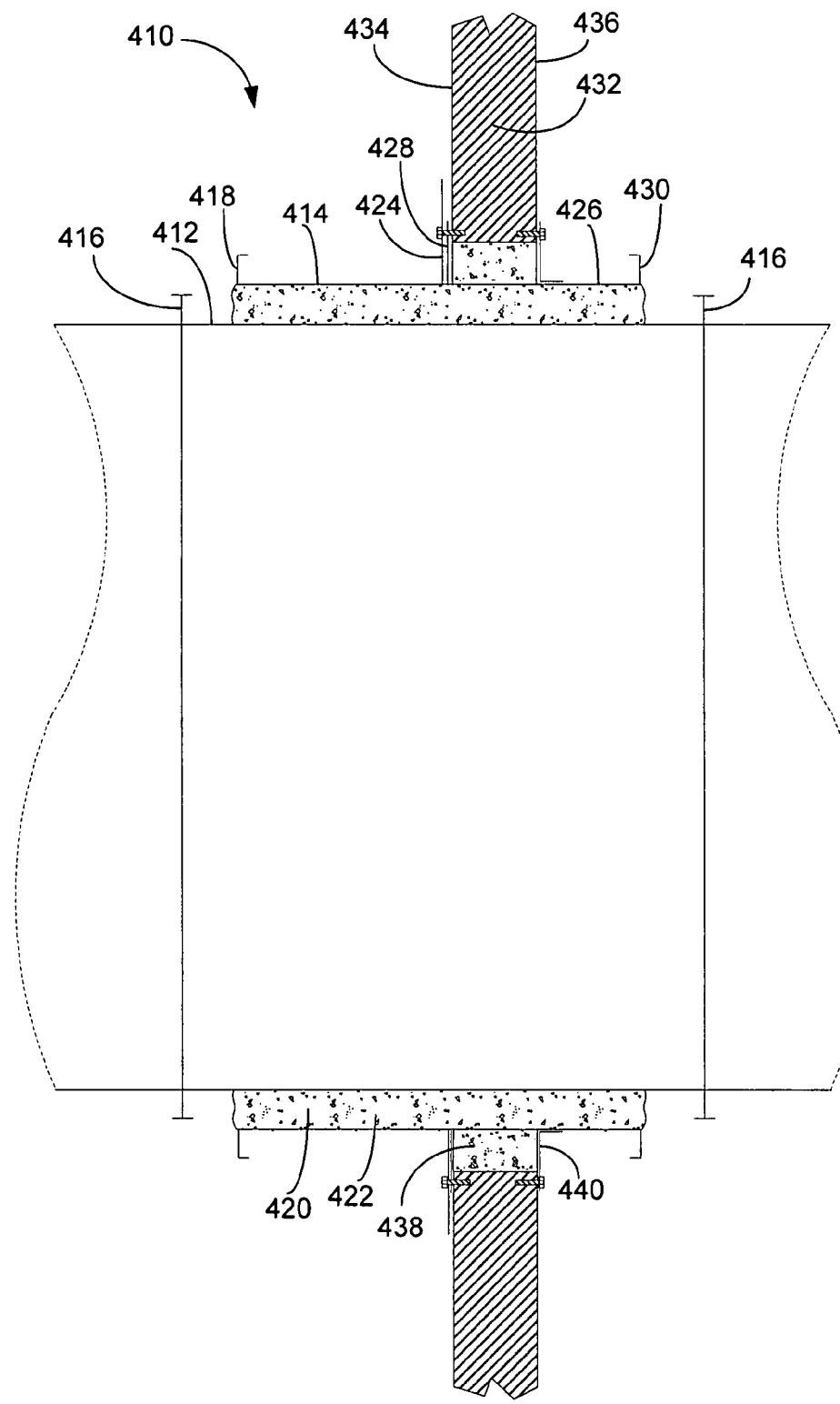
FIG. 6 is a side cross-sectional view of a through-wall penetration module constructed in accordance with a preferred embodiment.

Turning to FIG. 6, the same underlying process can also be used to prepare a through-wall penetration, which passes through a wall 432 having an outside edge 434 and inside edge 436. In the preferred embodiment, the through-wall module 410 includes an inner duct 412, outer duct 414, annular space 420, and a fill joint 426. The inner duct 412 includes flanges 416. The outer duct 414 includes first flange 418 and second flange 424. The fill joint 426 includes flanges 428 and 430. Annular space 420 is preferably filled with fluidized insulation 422.

To prepare for insertion of through-wall module 410 into the wall 432, a hole is cut in the wall 432 that will be slightly wider than the flange 430 of fill joint 426. The through-wall module 410 is then slid into the hole from the outside. The outer duct 414 ends at the outside edge 434 of the wall 432 with second flange 424, which preferably extends beyond the hole cut in the wall. The fill joint 426 also includes a flange 428 that contacts outer edge 434 of wall 432, and also preferably extends beyond the hole cut in the wall. In a preferred embodiment, flange 424 and flange 428 are secured to the wall with a screw. When necessary, an additional beauty flange (not shown) is added over top of flanges 424 and 428 to more completely seal the hole. The fill joint 426 extends inwardly through the hole in wall 432 and ends in flange 430 on the inside of wall 432.

Because the hole in wall 432 is cut larger than the width of the outer duct 414, void 438 is left open on either side of the through-wall module 410. After the through-wall module 410 has been installed, flashing 440 is attached to inner wall 436 to cover void 438. Fluidized insulation 422 is then injected through injection holes (not shown) in flashing 440, and the injection holes are capped and sealed.

Like the straight duct segment 110, both ends of the outer duct 414 stop several inches, preferably about 3", short of flanges 416 to facilitate attachment of additional duct segments to each side of through-wall module 410.

Preferred embodiments of the present invention provide an improved method of manufacturing ductwork. The resulting ductwork can be shipped and installed on modular basis. Unlike prior art modular systems, however, the ductwork produced in accordance with the present invention includes a substantially continuous insulation layer between adjacent joints. The continuous insulation layer provides a substantially hermetic seal and adds rigidity to the ductwork without adding excess weight to the overall system.

It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the spirit of the invention disclosed herein, in the associated drawings and the appended claims.

What is claimed is:

1. A method for manufacturing an insulated duct comprising the steps of:
    forming a first insulated duct segment, wherein the first duct segment has a first outer duct, a first inner duct placed inside the first outer duct, and a first annular space between the first inner duct and the first outer duct, and wherein the first annular space has been injected with an insulating material;
    forming a second insulated duct segment, wherein the second duct segment has a second outer duct, a second inner duct placed inside the second outer duct, and a second annular space between the second inner duct and the second outer duct, and wherein the second annular space has been injected with an insulating material;
    connecting the first inner duct to the second inner duct;
    connecting a fill joint between the first outer duct and the second outer duct to create a fill joint annular space; and
    injecting fluidized insulating material into the fill joint annular space.

2. The method of claim 1, wherein the step of connecting the first inner duct to the second inner duct includes clipping together flanged ends of the first and second inner ducts.

3. The method of claim 1, wherein the step of injecting fluidized insulating material comprises drilling an injection hole in the fill joint through which the insulating material is injected.

4. The method of claim 3, further comprising plugging the injection hole after the insulating material is injected.

* * * * *